United States Patent [19]
Franklin et al.

[11] Patent Number: 6,090,431
[45] Date of Patent: Jul. 18, 2000

[54] BEVERAGE BEANS AND METHODS FOR THEIR MANUFACTURE AND USE

[75] Inventors: Kerin B. Franklin, Louisville; Scott T. Graham, Lafayette, both of Colo.

[73] Assignee: Celestial Seasonings, Inc., Boulder, Colo.

[21] Appl. No.: 09/080,560

[22] Filed: May 18, 1998

[51] Int. Cl.[7] .............................. A23F 3/00; A23L 1/221; A23L 2/00
[52] U.S. Cl. ......................... 426/590; 426/594; 426/595; 426/596; 426/597; 426/598; 426/425; 426/433; 426/435
[58] Field of Search ..................... 426/590, 594, 426/595, 596, 597, 598, 425, 433, 435

[56] References Cited

U.S. PATENT DOCUMENTS

| | | | |
|---|---|---|---|
| 1,348,999 | 8/1920 | Kellogg . | |
| 1,349,000 | 8/1920 | Kellogg . | |
| 2,345,320 | 3/1944 | Brenzinger | 99/152 |
| 3,459,558 | 8/1969 | Farmer et al. | 99/65 |
| 3,660,107 | 5/1972 | Mayer | 99/66 |
| 4,031,238 | 6/1977 | Rein et al. | 426/285 |
| 4,076,847 | 2/1978 | Johnson et al. | 426/78 |
| 4,187,324 | 2/1980 | Shirbroun | 426/460 |
| 4,459,315 | 7/1984 | Salo | 426/590 |
| 4,576,826 | 3/1986 | Liu et al. | 426/289 |
| 4,634,598 | 1/1987 | Liu et al. | 426/650 |
| 5,227,188 | 7/1993 | Leppla et al. | 426/595 |
| 5,370,864 | 12/1994 | Peterson et al. | 424/49 |
| 5,601,865 | 2/1997 | Fulger et al. | 426/650 |
| 5,603,971 | 2/1997 | Porzio et al. | 426/96 |
| 5,620,707 | 4/1997 | Sanker et al. | 424/489 |

OTHER PUBLICATIONS

Rudnic, Dr. Edward et al., "Remington's Pharmaceutical Sciences—Oral Solid Dosage Forms," *Mac Publishing Company* Chapter 89 (1990).

*Primary Examiner*—Chhaya D. Sayala
*Attorney, Agent, or Firm*—Fulbright & Jaworski, LLP

[57] ABSTRACT

The invention provides a way for people to enjoy the ritual of selecting beans and grinding the beans to make them available for brewing. In one exemplary embodiment, a pelletized food product is provided which comprises a beverage base which includes individual pieces of edible plant materials which, when steeped or brewed, form a beverage. A binding material is provided which binds the beverage base into a pelletized body until subjected to a grinding process. Further, the pelletized body has a size and a range from about 0.2 cm to about 8 cm.

41 Claims, 2 Drawing Sheets

BEVERAGE BEANS AND METHODS FOR THEIR MANUFACTURE AND USE

BACKGROUND OF THE INVENTION

This invention relates generally to the field of beverages, and more particularly to the preparation of beverages as well as to the manufacture of the ingredients of such beverages. In a particular aspect, the invention provides a way for individuals to be able to enjoy the ritual of grinding "beans" for cold or hot brewing of beverages other than coffee.

Coffee is a beverage that is enjoyed throughout the world. For convenience, many coffee manufacturers sell their coffee in a ground state. In this way, coffee may be conveniently brewed by simply measuring out an appropriate amount of the ground coffee and placing it into a coffee maker.

Another popular way to market coffee is to sell whole coffee beans and allow the end user to grind the beans before brewing. Indeed, for many years, people have enjoyed the ritual of selecting coffee beans from wholesale or retail outlets based upon the taste characteristics and other known properties, e.g., decaffeination, and thereafter grinding the beans prior to brewing. Most recently, the popularity of fresh-brewed coffee in a variety of flavors and forms has reached a high degree as evidenced by the widespread popularity of coffee houses and the like.

Similarly, the same period has seen a wide increase in the popularity of a variety of health food drinks and of the consumption of dietary supplements in all forms. For example, herbal teas are increasing in popularity. Typically, herbal teas are packaged in a tea bag which is steeped in a hot or cold liquid to produce the beverage. As such, the rituals enjoyed by those drinking beverages other than coffee have been unable to enjoy the rituals of selecting beans, grinding the selected beans, and thereafter brewing.

Hence, it would be desirable to provide a way to allow individuals to enjoy the ritual of grinding "beans" for hot or cold brewing of beverages other than coffee. For example, it would be desirable to provide ingredients for producing a beverage other than coffee which is in the form of a "bean", with the "bean" being in a form that is suitable for grinding in traditional coffee grinders.

SUMMARY OF THE INVENTION

The invention provides a variety of food products as well as methods for their manufacture and their use in creating various beverages. In a preferable aspect, the food products of the invention comprise various ingredients that are manufactured into discrete bean-shaped pellets having a physical structure, e.g., hardness and friability, which is similar to that of coffee beans so that they may be ground in traditional coffee grinders. Thereafter, the ground beans may be cold-brewed or hot-brewed according to any of the methods known for making coffee or teas. In this way, individuals are able to enjoy the ritual of grinding "beans" for cold or hot brewing beverages other than coffee.

In one exemplary embodiment, the invention provides a pelletized food product which comprises a beverage base which includes individual pieces of edible plant materials which, once steeped or brewed, form a beverage. A binding material binds the beverage base into a pelletized body until subjected to a grinding process. Further, the pelletized body has a size in the range from about 0.2 cm to about 8 cm. In this manner, pelletized bodies are provided which in essence may be ground similar to coffee beans prior to forming a beverage.

Preferably, early pelletized body has a hardness in the range from about 0.1 kP to about 50 kP, and more preferably from about 0.5 kP to about 34 kP as measured on a Vankel VK200 Hardness Tester. In this way, each pelletized body has a hardness that is similar to the hardness of a coffee bean to allow for grinding. Preferably, the pelletized body is formed so that it will become granularized when ground in a grinder.

A variety of edible plant materials may be used to construct the pelletized body, including tea leaves, plant leaves, roots, flowers, hops, spices, and the like. Exemplary binding materials which may be used to bind the edible plant materials into a pelletized body include starches, sugars, modified starches, maltodextrins, carrageenan, gums, cellulose, waxes, and the like.

Preferably, the pelletized body has a generally bean-like shape, such as in the shape of a coffee bean. Optionally, a supplement may be included in the pelletized body. For example, exemplary supplements which may be employed include dietary supplements, such as vitamins, minerals, and herbal extracts, medicaments, and the like. In one alternative, a core element may be included in the pelletized body which releases at least one ingredient when the pelletized body is ground into granules. For example, the ingredient may comprise a scented material which emits an aroma when the pelletized body is ground into granules. In another example, the ingredient may comprise a flavored material. Other ingredients which may be included within the core include colors, and functional ingredients, such as standardized extracts, herbal extracts, other nutritional components, such as vitamins, minerals, amino acids, and the like.

The invention further provides an exemplary method for making a beverage. According to the method, a plurality of pelletized bodies are provided, with each body comprising a beverage base of edible plant materials that are bound together by a binding material. The pelletized bodies are then placed into a package and marketed in packaged form. When ready for consumption, at least some of the pelletized bodies are removed from the package and are ground into granules. The granules are then steeped or brewed in a liquid to form a beverage. Conveniently, the pelletized bodies may be marketed in bulk form or in individual packages. In some cases, the pelletized bodies may marketed in a pre-ground state.

Preferably, the pelletized bodies have a generally bean-like shape and have a hardness that is similar to a coffee bean so that the pelletized bodies may be ground in conventional coffee grinders. For example, the pelletized bodies may have a hardness in the range from about 0.1 kP to about 50 kP, and more preferably from about 0.5 kP to about 34 kP.

After grinding, the granules may be steeped or brewed in a hot or cold liquid to form the beverage. For example, the granules may be brewed through a conventional coffee making machine. Optionally, the pelletized body may include a supplement. In another alternative, an aroma may be released from the pelletized body during the grinding step. In a further option, a flavored material or a color may be released from a core element disposed in the pelletized body during the grinding step.

DETAILED DESCRIPTION OF THE SPECIFIC EMBODIMENTS

The invention provides an exemplary food product that is constructed from edible plant materials and has qualities similar to coffee beans so that the food product may be ground into granules in a manner similar to that commonly employed when making coffee from coffee beans. The food product is preferably manufactured in pelletized form and has the qualities of a coffee bean, e.g., similar size, shape and hardness. In this way, the food product may be marketed in a manner similar to coffee beans, thereby allowing consumers to use the same rituals with other food products as is now currently employed when making coffee directly from coffee beans. In some cases, the pellets may be marketed in a pre-ground state.

Figure 1:
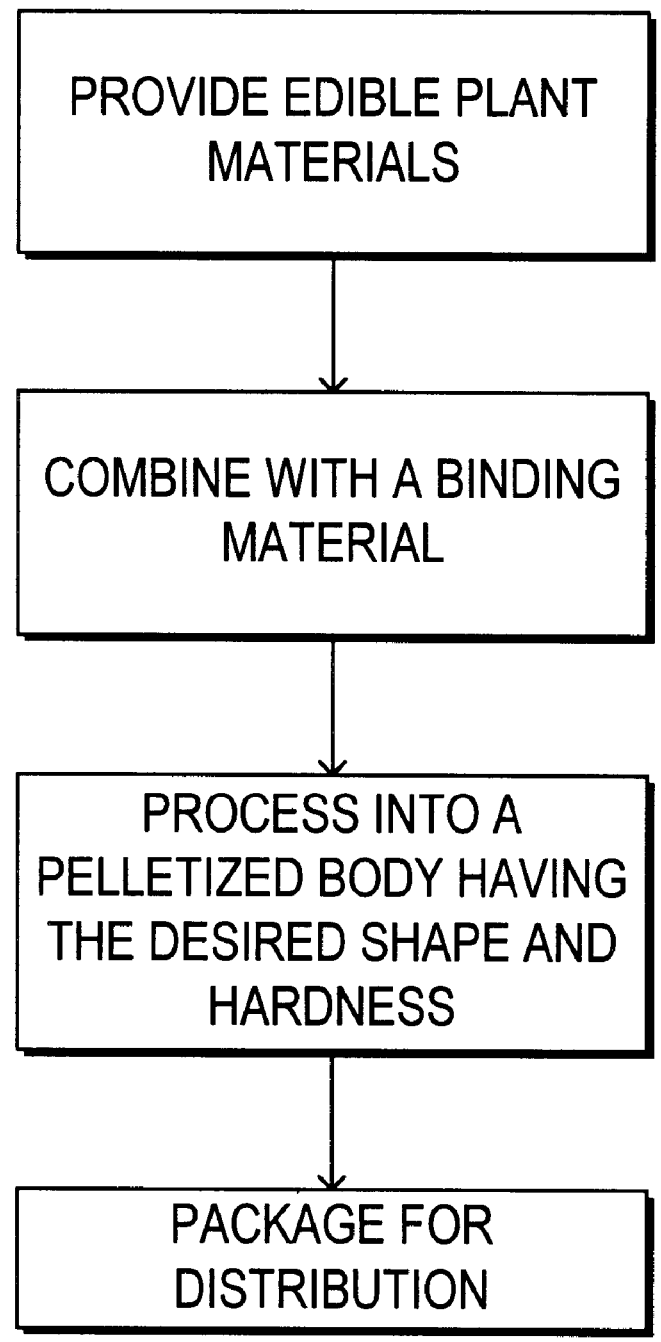
FIG. 1 is a flow chart illustrating an exemplary method for producing a pelletized food product according to the invention.

An exemplary method for manufacturing such a food product is illustrated in FIG. 1. Initially, edible plant materials are provided from which a beverage base is to be produced. Exemplary edible plant materials which may be used include tea leaves, stems, plant leaves, roots, flowers, hops, grains, seeds, bark, oils, spices, and the like. To produce the beverage base, the edible plant materials are processed into a particlized form, a liquid form, a paste or various combinations of each. As one example, the edible plant materials may be ground into small individual particles or into a fine powder.

The edible plant materials are then combined with a binding material which maintains the plant materials in pelletized form until subjected to a grinding process. Exemplary binding materials that may be employed to bind the edible plant materials together include starches, modified starches, gelatin, sugars such as sucrose, glucose, dextrose, xylitol, mannitol, sorbitol, molasses and lactose, maltrodextrins, carrageenans, natural and synthetic gums, including acacia sodium alginate, extract of Irish moss, panwar gum, ghatti gum, mucilage of isapol husks, carboxymethylcellulose, methylcellulose, polyvinylpyrrolidone, Veegum, larch arabogalactan, and the like. Other binding agents include celluloses, waxes, polyethyleneglycol, ethylcellulose, water, alcohol, and the like.

Optionally, one of a variety of encapsulation processes may be employed during the process to protect the ingredients from volatilization, the degradation effects of oxygen and heat, moisture, internal and external molecular interactions, and the like. For example, the ingredients may be combined with a matrix material, typically when the matrix material is in a melted or liquid state. As such, the encapsulation process may involve the use of various materials which act as binding agents. Exemplary encapsulation processes which may be utilized by the invention include those described in U.S. Pat. Nos. 5,601,865 and 5,603,971, the complete disclosures of which are herein incorporated by reference.

When combined with the proper binding material, the beverage base is processed to produce pelletized bodies having the desired shape, hardness, friability and the like. A variety of processes may be employed to produce the pelletized bodies including molding, extrusion, compression, pelletization, spray drying, and the like. Further, the methods for producing oral solid dosage forms as described in *Remington's Pharmaceutical Sciences*, Mac Publishing Company, 1990, Chapter 89, may be employed. The complete disclosure of this reference is herein incorporated by reference.

One preferred way to produce pelletized bodies is by using an extrusion process. Exemplary extrusion processes are described in "Introduction and General Principles of Food Extrusion", Dr. Waleed A. Yacu, Short Course—Food Extrusion Technology, The Center for Professional Advancement—East Brunswick, N.J., Section A—Pages 1–38, the complete disclosure of which is herein incorporated by reference. Optionally, as previously described, the extrusion process may be combined with an encapsulation process as described in U.S. Pat. No. 5,601,865, previously incorporated by reference.

Briefly, suitable extruders for producing pelletized bodies according to the invention comprise single or twin screw extruders having mixing zones, homogenizing zones, melting zones, venting zones and the like as is known in the art. A specially shaped die is preferably employed to form the extrudate into the shape of a bean or other desired shape. With such extruders, the edible plant materials are typically inserted into the extruder and combined with the binding material to form a dough. As the screw rotates, the dough is moved through the extruder and through the die to form the bean. Various zones may be included within the extruder to cook, vent, add steam, and the like.

As another example, the pelletized bodies may be formulated in tablet form. One typical type of tablet form is a compression tablet. When producing the pelletized body in tablet form, the tablet will typically include the edible plant materials and a binder which is in solution form or in dry form. Optionally, lubricants may be employed to prevent adhesion of the tablet material to the surface of the dies and punches, to reduce interparticle friction, to facilitate the ejection of the tablets from the die cavity and to improve the flow rate of the tablet granulation. A glidant may also optionally be used to improve the flow characteristics of the powder mixture. Further, coloring agents may be added to assist the manufacturer to control the product during preparation as well as to allow for identification of the type of bean by the user. Further, various flavoring agents may be added to enhance the flavor of the beverage. Colors will typically be added to the tablet formulation by dissolving the dye into the binding solution prior to the granulization process.

To prepare the pelletized body in tablet form, a variety of preparation methods may be employed. One preparation is the wet-granulation method, which involves the steps of weighing, mixing, granulation, screening the damp mass, drying, dry screening, lubrication, and compression. Using the wet granulation method, the edible plant materials are weighted and then mixed together to form a homogeneous mixture. Optionally, the powder blend may be sifted through a screen of suitable fineness to remove or break up any lumps, as well as to assist in mixing.

Following mixing, the binding agent is added to the mixed powder, typically by stirring. Preferably, the powder mass is wetted with the binding solution until the mass has a consistent dampness. The wet granulation is then forced through a screen, such as a 6 or 8 mesh screen. In some cases, an extruder may be justified to extrude the wetted granulation through a perforated screen. Following straining, the granulation is then placed into a dryer and the granulation is dried to the desired moisture content.

Following drying, the granulation is reduced in particle size by passing it through a smaller mesh screen. As one example, tablets having approximately a 3/16th inch diameter may employ the use of a 20 mesh screen. If desired, a lubricant may then be added to the fine powder. The mixture is then ready to be compressed as described in greater detail hereinafter.

If the ingredients are sensitive to moisture or are unable to withstand elevated temperatures during drying, a dry granulation method may be employed. This method includes the steps of weighing, mixing, slugging, dry screening, lubrication and compression. Still other methods include spherenization, spray drying, and spray congealing. In spherenization, spherical particles are produced using a sphereonizer. The pellets may then be dried using conventional methods, mixed with suitable lubricants and compressed into tablets or used as a capsule-fill material. In spray drying, a highly disbursed liquid and a sufficient volume of hot air are brought together to produce evaporation and drying of liquid droplets. The spray dried powder particles are then collected and directly compressed into tablet form. Encapsulation of the powder may also be employed. In spray congealing, solids are melted and reduced to beads or powder by spraying a molten bead into a stream of air or other gas.

To compress the powder into tablet form, a tablet machine is preferably employed. An exemplary tablet machine includes two steel punches within a steel die cavity. The tablet is then formed by the pressure exerted on the granulation by the punches within the die cavity. The tablet assumes the size and shape of the punches and the die used. The tablet is preferably in the shape of a bean, although other shapes may be provided, including oval, circular, capsule form, and the like. Typically, the pelletized body has a size in the range from about 0.2 cm to about 8 cm, and more preferably from about 0.5 cm to about 3 cm. A variety of tablet machines may be employed to compress the granulation, including single punch machines, rotary tablet machines, high speed rotary tablet machines, and the like.

As previously described, another method for producing the pelletized bodies is by using a molding process, also referred to as tablet triturates. Such molded tablets are formed by forcing a moistened blend of the edible plant material and diluent into a mold, extruding the formed mass, and drying the mass. The diluent may include lactose, mannitol, dextrose, any sugar or starch material, or other rapidly soluble materials. The molds typically comprise two plates made of a hard material. One mold plate includes carefully polished perforations while the other plate is fitted with a corresponding number of projecting pegs or punches which fit the perforations in the mold plate. The mold plate is placed on a flat surface and the moistened mass is forced through the perforations and the excess is scraped from the top surface. The mold plate is then placed over the plate with the corresponding pegs and lowered. As the plates come together, the pegs force the tablet triturates from molds.

As another alternative, the pelletized bodies are molded using confectioner or candy making processes. In such processes a sugar or syrup solution is heated and then placed into a mold as is know in the art.

The resulting pelletized body preferably has a hardness similar to that of a coffee bean. The hardness is a measure of the resistance of the pelletized body to chipping, abrasion or breakage under conditions of storage, transportation, and handling before usage. Preferably, the pelletized bodies have a hardness in the range from about 0.1 kilo pounds (kP) to about 50 kP, and more preferably from about 0.5 kP to about 34 kP as measured on a Vankel VK200 Hardness Tester. When tested on a Instron having a 3 mm probe which is moved at a compression rate of 5 mm/min., the pelletized bodies preferably have a hardness in the range from about 250 $g/mm^2$ to about 4000 $mm^2$.

The pelletized bodies preferably also have a friability that is sufficient to allow the pelletized body to be appropriately ground with conventional coffee grinders. Friability is defined as the force required to crush the pelletized body. The desired friability also allows the pelletized body to withstand abrasion when packaging, handling and shipping. Preferably the pelletized bodies have a friability which produce a loss of less than about 0.05%, and preferably less than about 0.02% as measured on a Vankel Friabilatator.

The pelletized bodies of the invention may be provided with a variety of optional ingredients depending on the desired end product. For example, various colors, flavors, scents, supplements, functional ingredients, and the like may be added to the beverage base. As one example, a central core may be provided in the pelletized body which includes a flavor or a scent which is released when the pelletized body is ground into granules. Alternatively, the flavors or scents may be mixed with the edible plant materials during the process of formulation as previously described. As another alternative, various flavors, scents, functional ingredients, colors, and the like may be coated on the outside of the pelletized bodies, such as with a spraying or coating process. Exemplary supplements that may be included in the pelletized body include dietary supplements, such as vitamins, minerals, amino acids, standardized or non-standardized herbal extracts, and herbal supplements, medicaments, and the like. Further, the pelletized bodies may optionally include coatings as described above, layers of ingredients, and the like.

After producing the pelletized bodies, the bodies are packaged for distribution as illustrated in FIG. 1. Preferably, the pelletized bodies are packaged in a manner similar to that employed with commercially available coffee beans, although other packaging schemes may be employed. In some cases, the pelletized bodies may be ground prior to packaging.

Figure 2:
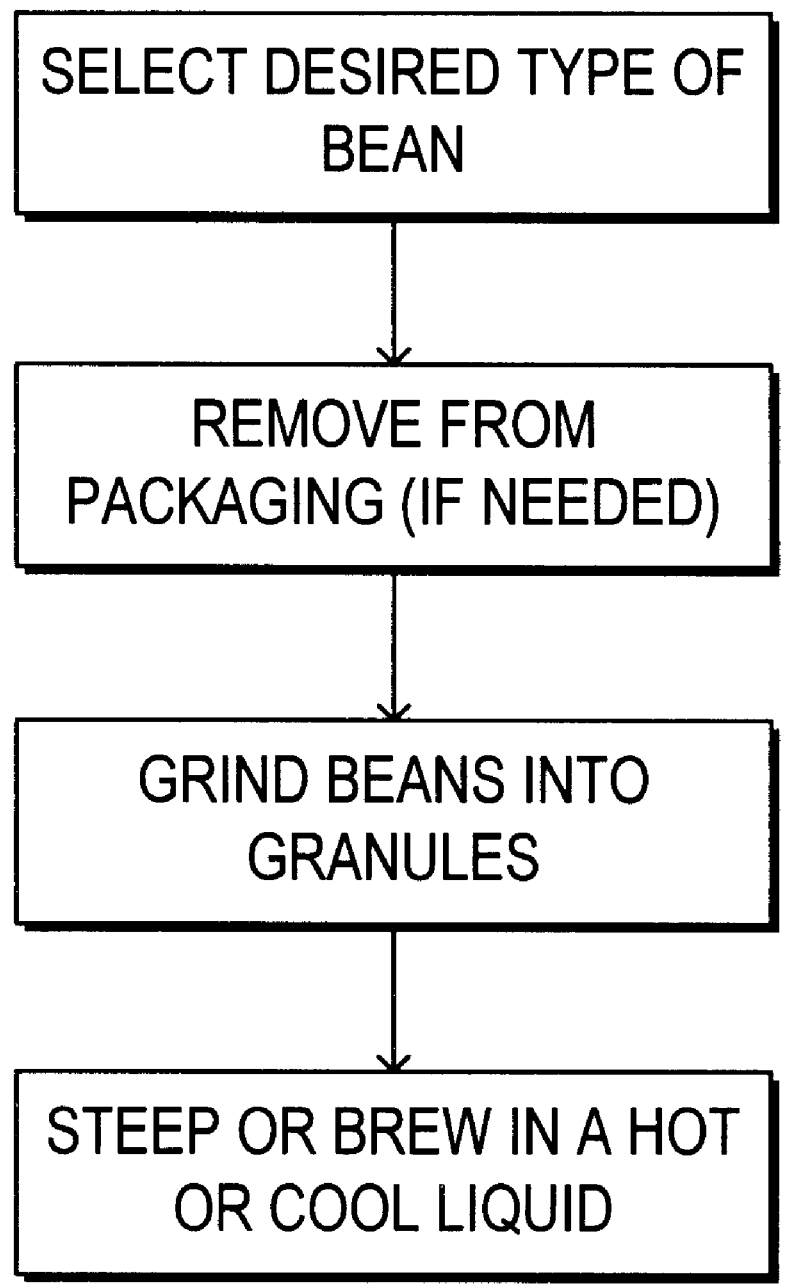
FIG. 2 is a flow chart illustrating an exemplary method for preparing a beverage from the food product produced according to the method of FIG. 1.

As illustrated in FIG. 2, when ready to produce a beverage from the pelletized bodies, a user selects the desired type of pelletized bodies, also referred to as "beans". For example, if sold at a retail level, a shelf may include a number of bins with a variety of bean types, i.e. in bulk form. Alternatively, the beans made be sold in packages. The consumer may then select the type of bean, remove the beans from the bins, and purchase the beans. When ready to produce the beverage, the beans are placed in a conventional coffee grinder (or similar grinder) and ground into granules in a manner similar to that performed when grinding coffee beans. In some cases, the retailer may offer the consumer the option of having the beans ground at the time of purchase. Following grinding, the granules may be steeped or brewed in either a hot or cold liquid to produce the desired beverage. For example, the granules may be placed into traditional tea bags (or kept in loose form) and steeped. As another example, a French press process may be used. Preferably, the granules will be brewed in a coffee machine.

Hence, the invention provides a way for individuals to enjoy the rituals associated with marking coffee from beans while also producing a non-coffee beverage. In this way, consumers are not limited to the use of coffee beans to produce a desired beverage using techniques associated with coffee brewing.

The invention has now been described in detail for purposes of clarity and understanding. However, it will be appreciated that certain changes and modifications may be made. Therefore, the scope and content of this invention are not limited by the foregoing description. Rather, the scope and content are to be defined by the following claims.

What is claimed is:

1. A pelletized food product, comprising:
   a beverage base comprising individual pieces of edible plant materials selected from the group consisting of plant leaves, stems, roots, flowers, hops, bark, grains, and seeds which when steeped or brewed form a beverage; and
   a binding material which binds the beverage base into a pelletized body, wherein the binding material maintains the beverage in a pelletized form until subjected to a grinding process, and wherein the pelletized body has a size in the range from about 0.2 to about 8 cm.

2. A product as in claim 1, wherein the pelletized body has a hardness in the range from about 0.1 kP to about 50 kP.

3. A product as in claim 1, further comprising a supplement or a functional ingredient included in the pelletized body.

4. A product as in claim 3, wherein the supplement is selected from the group of supplements consisting of dietary supplements, vitamins, minerals, herbal supplements, and medicaments.

5. A product as in claim 1, further comprising a core element included in the pelletized body, wherein the core element includes at least one ingredient which is released when the pelletized body is ground into granules.

6. A product as in claim 5, wherein the ingredient comprises a scented material which emits an aroma when the pelletized body is ground into granules.

7. A product as in claim 5, wherein the ingredient comprises a flavored material.

8. A product as in claim 1, wherein the beverage base is steepable or brewable when the pelletized body is ground into granules.

9. A product as in claim 1, wherein the pelletized body has a bean-like shape.

10. A product as in claim 1, wherein the binding material is selected from the group of binding materials consisting of starches, sugars, modified starches, maltrodextrins, carrageenan, gums, celluloses, waxes, gelatin, sugars, including sucrose, glucose, dextrose, molasses and lactose, maltrodextrins, carrageenans, natural and synthetic gums, including acacia sodium alginate, extract of Irish moss, panwar gum, ghatti gum, mucilage of isapol husks, carboxymethylcellulose, methylcellulose, polyvinylpyrrolidone, Veegum, larch arabogalactan, polyethyleneglycol, ethylcellulose, water, and alcohol.

11. The pelletized food product of claim 1, wherein said plant leaves are tea leaves.

12. The pelletized food product of claim 1, wherein said edible plant material is a spice.

13. The pelletized food product of claim 1, wherein said edible plant material is a root.

14. The pelletized food product of claim 1, wherein said edible plant material is a bark.

15. A pelletized food product, consisting essentially of:
   a primary component comprising a beverage base of individual pieces of edible plant materials selected from the group consisting of plant leaves, stems, roots, flowers, hops, bark, grains, and seeds which when steeped or brewed from a beverage; and
   a binding material which binds the beverage base into a pelletized body, wherein the binding material maintains the beverage base in a pelletized form until subjected to a grinding process and wherein the pelletized body has a size in the range from about 0.2 cm to about 8 cm.

16. The pelletized food product of claim 15, wherein said plant leaves are tea leaves.

17. The pelletized food product of claim 15, wherein said edible plant material comprises at least one spice.

18. The pelletized food product of claim 15, wherein said edible plant material is plant leaves.

19. A method for making a beverage, the method comprising:
   providing a plurality of pelletized bodies, each body comprising a beverage base of edible plant materials selected from the group consisting of plant leaves, stems, roots, flowers, hops, bark, grains, and seeds bound together by a binding material;
   placing the pelletized bodies into a package;
   removing at least some of the pelletized bodies from the package;
   grinding the removed pelletized bodies into granules; and
   steeping or brewing the granules in a liquid to form a beverage.

20. A method as in claim 19, further comprising releasing an aroma from the pelletized body during the grinding step.

21. A method as in claim 19, further comprising releasing a flavored material from a core element in the pelletized body during the grinding step.

22. A method as in claim 19, wherein the granules are steeped or brewed in a cold or a hot liquid.

23. A method as in claim 19, further comprising providing the pelletized body with a supplement selected from the group of supplements consisting of dietary supplements, herbal extracts, and medicaments.

24. The method of claim 19, wherein said plant leaves are tea leaves.

25. The method of claim 19, wherein said edible plant material comprises at least one spice.

26. The method of claim 19, wherein said edible plant material is the plant leaves.

27. A method as in claim 19, wherein the pelletized body has a bean-like shape.

28. A method as in claim 19, wherein the pelletized bodies have a hardness in the range from about 0.1 kP to about 50 kP.

29. A method for making a beverage product, the method comprising:
   providing a beverage base of individual particles of edible plant materials selected from the group consisting of plant leaves, stems, roots, flowers, hops, bark, grains, and seeds; and
   organizing the individual particles into a pelletized body that is in the shape of a bean, wherein the pelletized body has a hardness sufficient to maintain the pelletized body generally intact until subjected to a grinding process, and
   wherein the hardness is in the range from about 0.1 kP to about 50 kP.

30. A method as in claim 29, wherein the individual particles are held together with a binding material.

31. A method as in claim 29, wherein the binding material is selected from the group of binding materials consisting of starches, sugars, modified starches, maltrodextrins, carrageenan, gums, celluloses, waxes, gelatin, sugars, including sucrose, glucose, dextrose, molasses and lactose, maltrodextrins, carrageenans, natural and synthetic gums, including acacia sodium alginate, extract of Irish moss, panwar gum, ghatti gum, mucilage of isapol husks, carboxymethylcellulose, methylcellulose, polyvinylpyrrolidone, Veegum, larch arabogalactan, polyethyleneglycol, ethylcellulose, water, and alcohol.

32. A method as in claim 29, further comprising including a supplement in the pelletized body.

33. A method as in claim 32, wherein the supplement is selected from the group of supplements consisting of dietary supplements, herbal extracts, and medicaments.

34. A method as in claim 29, further comprising including a core element in the pelletized body, wherein the core element includes at least one ingredient which is released when the pelletized body is ground into granules.

35. A method as in claim 34, wherein the ingredient comprises a scented material which emits an aroma when the pelletized body is ground into granules.

36. A method as in claim 34, wherein the ingredient comprises a flavored material.

37. A method as in claim 29, wherein the beverage base is brewable when the pelletized body is ground into granules.

38. The method of claim 29, wherein said plant leaves are tea leaves.

39. The method of claim 29, wherein said edible plant material comprises a spice.

40. The method of claim 29, wherein said edible plant material is the plant leaves.

41. The method of claim 29, wherein said edible plant material comprises a spice.

* * * * *